United States Patent [19]
Crump et al.

[11] 3,912,980
[45] Oct. 14, 1975

[54] DIRECT CURRENT ARC POWER SUPPLY

[75] Inventors: Gwyn Norman Crump; Gary Allen Bogard; Henry Byron Delius, all of Newark, Ohio

[73] Assignee: Air Products and Chemicals, Inc., Allentown, Pa.

[22] Filed: Mar. 20, 1974

[21] Appl. No.: 452,720

[52] U.S. Cl. ........ 317/31; 219/131 WR; 317/33 SC; 321/19
[51] Int. Cl.² .......................................... H02H 3/10
[58] Field of Search ............... 219/131 WR; 321/19; 317/31, 33 SC

[56] References Cited
UNITED STATES PATENTS

| | | | |
|---|---|---|---|
| 3,549,978 | 12/1970 | Stearns et al. ........................ | 321/19 |
| 3,688,180 | 8/1972 | Chiasson et al. ............ | 219/131 WR |
| 3,805,142 | 4/1974 | Rando.................................. | 321/19 |

*Primary Examiner*—James D. Trammell
*Attorney, Agent, or Firm*—James C. Simmons; Barry Moyerman

[57] ABSTRACT

An arc power supply system having a three phase transformer and a rectifier which includes silicon controlled rectifiers. A feedback control system sums (1) a reference setpoint signal, (2) an adjustable voltage feedback signal, (3) an adjustable current feedback signal and (4) a series of pulses from a pulse generator. To provide overcurrent protection, the current feedback is compared with a reference to deactivate the supply system when the current feedback is greater than the reference for a predetermined duration of time. Further, start means compares the current feedback with a start reference upon start up to produce a value of direct current different from a normal value direct current. Further protection is provided from adverse effect of interference from switching surges, lightning, load surges and other interference generating equipment.

15 Claims, 3 Drawing Figures

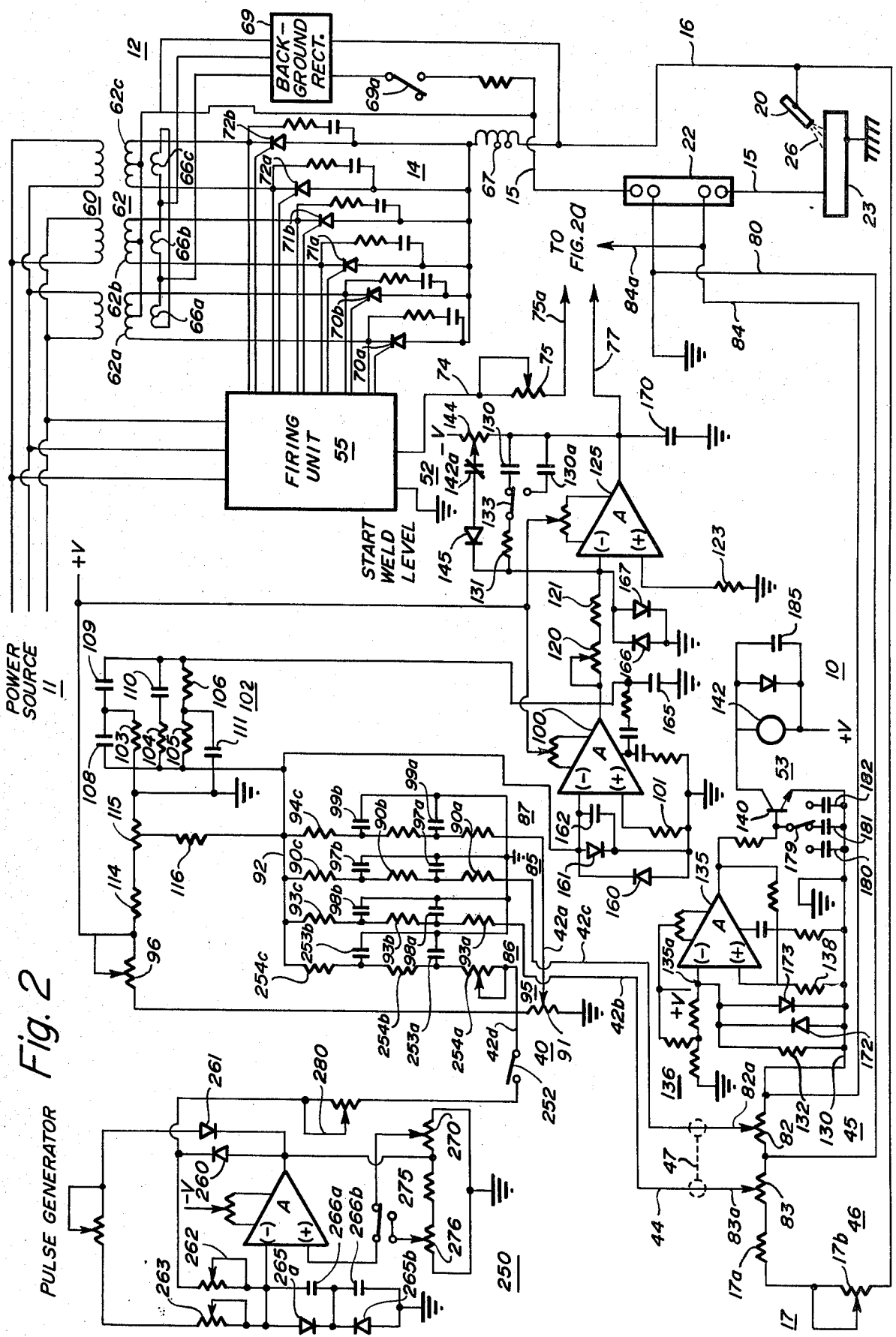

OVER CURRENT PROTECTION 200

DIRECT CURRENT ARC POWER SUPPLY

BACKGROUND OF THE INVENTION

A. Field of the Invention

This invention relates to the field of art of direct current arc power supplies having feedback control systems.

B. Prior Art

Direct current power supplies are well known in the art in which an arc is established and maintained between a pair of electrodes. In such systems, the line voltage is reduced in potential by means of a transformer and its output is rectified for establishing a desired DC voltage and current output. Such an arc welding supply is disclosed, for example, in U.S. Pat. No. 3,549,978 in which there is used silicon controlled rectifiers and in which there is provided both current and voltage feedback control. Important improvements have been made by U.S. patent application Ser. No. 378,265 for DIRECT CURRENT ARC POWER SUPPLY by George E. Cook, filed July 11, 1973 and assigned to the same assignee as the present application.

However, further improvements have been required to ameliorate certain problems such as electrical disturbances and interference from the shop environment in which the welding supplies have been used. These disturbances and interference have included electrical switching surges from contactor, solenoid and switch gear operation, lightning or other large magnitude sudden surges, inpulse arc starting equipment, high frequency energy radiating arc starting equipement, and other equipment generating interference, etc. Such interference have had an adverse effect upon the welding supply.

Further, it has been known in arc welders using silicon controlled rectifiers to provide devices, such as, fuses or circuit breakers to protect the recifiers from an excessively high current which may occur during start up or from a malfunction. Such fuses or circuit breakers are relatively expensive and impractical in that they failed to open under short term surge conditions, for example, which were sufficient to harm the rectifiers but were not sufficient to blow the fuse or open the breaker. This occurred particularly in the Gas Metal Arc Welding [GMAW (MIG)] process whenever, at the start, excessive weld metal is required to be melted and thus an extremely high surge current is produced. However, a moderate surge current is normal and necessary and can be properly provided. Since the time duration of a moderate surge current is short, it is not harmful to the rectifiers. It has been found that this problem arose because fuses or circuit breakers did not have protective characteristics which would match the characteristics of the rectifiers. Thus, the fuses or breakers would not provide protection on all possible damage inducing current excursions of the rectifiers. Also, when the fuse would blow or the overcurrent breaker or relay would open, the fuse would have to be replaced or the breaker reset after having caused costly and unnecessary down time. Unless a means of monitoring each fuse is provided, the blowing of one fuse could endanger welder performance, Other means of limiting surge currents have been used such as the use of impedance or resistances in circuit with the silicon control rectifiers. However, complete reliance on these solutions have been quite costly not only in the expense of the components but also in space requirements, welder performance and energy loss. In addition, these impedance or resistances have also required further means to limit moderate overloads.

SUMMARY OF THE INVENTION

An arc power supply for applying direct current to a pair of electrodes which establishes and maintains an arc between the electrodes. A set reference signal is produced relating to a desired value of direct current. The arc current is sensed to provide an adjustable current feedback signal. In addition, the voltage across the electrodes is sensed to provide an adjustable feedback voltage signal. A feedback control system sums the set reference signal, the adjustable current feedback signal and the adjustable voltage feedback signal and applies a resultant control signal to a power circuit to control the volt-ampere slope characteristic. An overcurrent protection circuit compares the adjustable current feedback signal with a protection reference signal for deactivating the power circuit when the adjustable current feedback signal is of value greater than the protection reference signal for a predetermined duration of time. In this manner, the arc power supply is protected from overcurrent.

Further in accordance with the invention, a start circuit is provided for preselecting the adjustable output of the silicon controlled devices for selectable period of time prior to operation of the feedback circuitry. The start circuitry thus allows time for the weld puddle to become stable enough to beneficially respond to feedback control.

BRIEF DESCRIPTION OF THE DRAWINGS

FIGS. 2–2a is a schematic circuit diagram showing details of the block diagram of FIG. 1.

DESCRIPTION OF THE PREFERRED EMBODIMENTS

Figure 1:
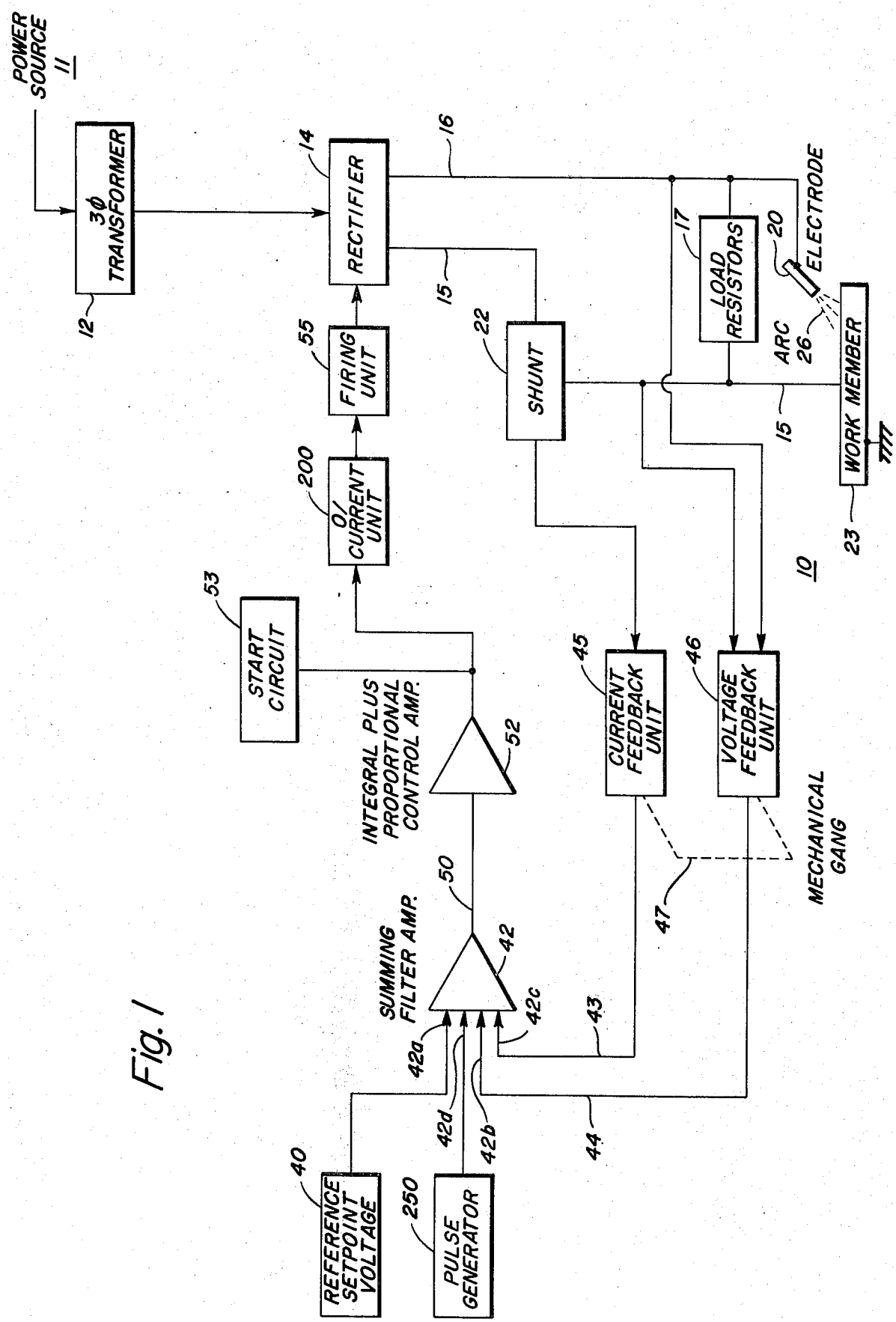
FIG. 1 is a block diagram of a direct current arc power supply in accordance with the invention.

General Description — FIG. 1

Referring now to FIG. 1, there is shown an arc power supply system 10 in which a three phase power source 11 supplies a polyphase welding transformer 12. Transformer 12 provides an alternating current input to a polyphase rectifier assembly 14. Rectifier 14 has a pair of output leads 15 and 16 with output lead or load line 16 indicated as the negative lead and output lead or load line 15 indicated as the positive lead.

Figure 2A:
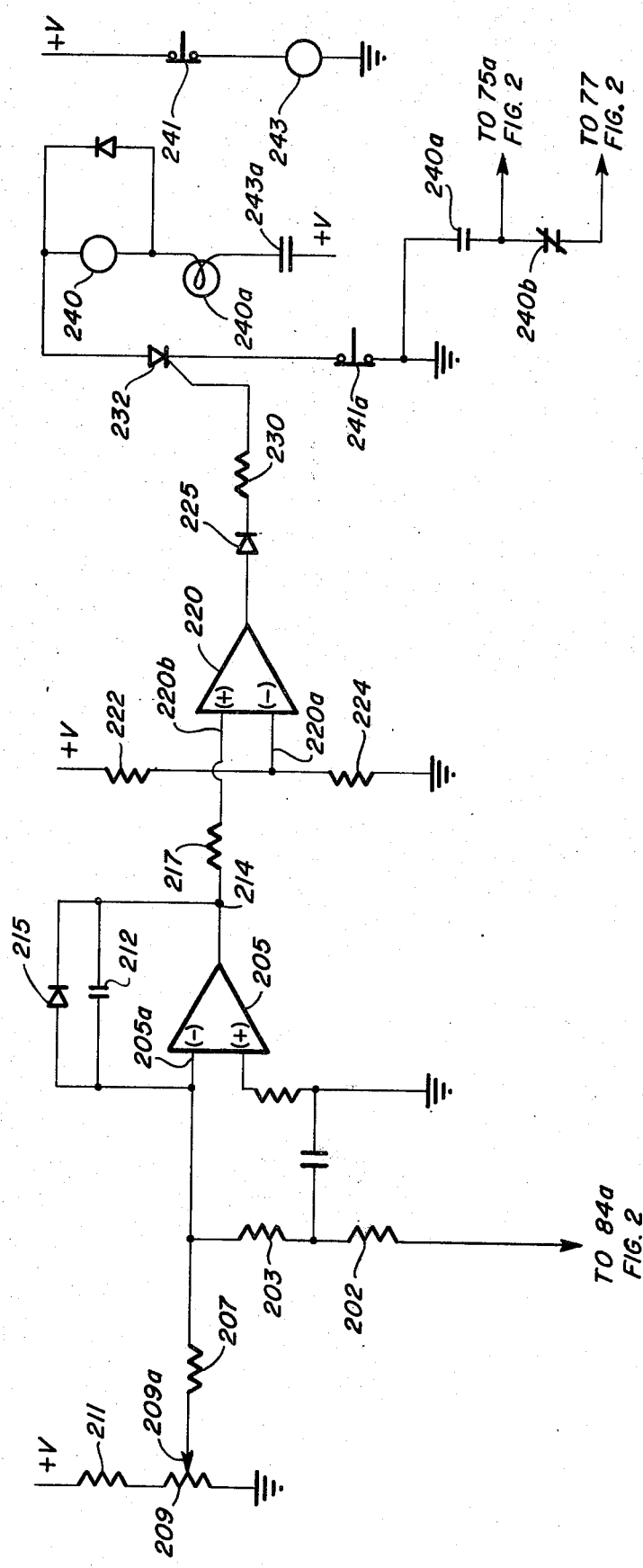

In the illustrated embodiment of the supply system of FIG. 10, output negative lead 16 is normally connected to an electrode 20 while output positive lead 15 is normally connected by way of a shunt 22 to a work member 23. When supply system 10 is energized, an arc 26 is established and maintained between electrode 20 and work member 23. Work member 23 is the only element connected to actual ground as illustrated by the symbol for "earth". Remaining circuit elements in FIGS. 2–2a are shown connected to "control common" designated by the symbol normally used for ground.

The foregoing connections of leads 15 and 16 are useful for both the manual and automatic modes of the Gas Tungsten Arc Welding ("GTAW" or "TIG") process and for certain modes of the Shielded Metal Arc Welding process (dependent on the particular type of shielded electrode 20 used). For the remaining modes of the Shielded Metal Arc Welding process and for both the short arc and spray transfer modes of the Gas Metal Arc Welding process, lead 15 is normally connected to electrode 20 while lead 16 is normally connected to work member 23.

For proper arc welding in the manual mode of the GTAW (TIG) process, the volt-ampere characteristic of system 10 is usually preset so that a desired straight line characteristic is substantially tangent to an ideal constant power characteristic (K). With the volt-ampere characteristic of sysem 10 set in this manner, automatic compensation for variations in changes of electrode 20 with respect to work member 23 may be achieved.

In the automatic mode of the Gas Tungsten Arc Welding process, a true constant current volt-ampere characteristic of system 10 is preset normally to either mode, arc voltage is normally maintained constant by means of fixturing or a separate automatic arc voltage controller which controls electrode 26, as described for example in U.S. Pat. No. 2,516,777 for Control Apparatus for Automatic Welding Heads.

In the spray transfer mode of the Gas Metal Arc Welding [GMAW (MIG)] process, the volt-ampere characteristic of sysetm 10 is preset normally to either a true constant potential characteristic or a slightly drooping (negative slope) characteristic. In the short arc mode of the GMAW process, the volt-ampere characteristic of system is preset normally to a higher magnitude negative slope characteristic than that in the spray transfer mode. On the other hand, in the Shielded Metal Arc Welding mode, the volt-ampere characteristic is most often set the same as in the manual mode of the GTAW (TIG) process for out of position welding and for true constant current for "flat" welding.

Referring again to supply system 10, a reference set point voltage input 40 (set in a manner to be described) is applied to one input 42a of a summing filter amplifier 42. A second input 42c of amplifier 42 is connected to a current feedback unit 45 while a third input 42b to amplifier 42 is taken from a voltage feedback unit 46. In this manner, amplifier 42 is effective to sum the set reference signal, an adjustable current feedback signal and an adjustable voltage feedback signal.

A fourth input 42d of amplifier 42 is connected by way of a switch 252 to a pulse generator 250. For this discussion, it will be assured that switch 252 is open. The operation of generator 250 will later be described in detail.

Current feedback unit 45 obtains its current input from a current sensor or shunt 22 which provides a signal proportional to the current through lead 15 (arc current I). Load resistors 17 are connected between leads 15 and 16 and voltage feedback unit 46 is connected across load resistors 17 to provide a signal proportional to the voltage across arc 26. Units 45 and 46 comprise potentiometers which are mechanically ganged by gang 47. The potentiometers are ganged so that with a setting at one extreme (as for example, clockwise) the voltage feedback signal at voltage feedback conductor 44 is of zero value and the current feedback signal at current feedback conductor 43 is to maximum magnitude. Accordingly, at the output 50 of amplifier 42 there is produced a voltage signal proportional to the setting of reference 40 which at that time establishes the desired set point of current.

On the other hand, with gang 47 at the other extreme (as for example, counterclockwise), the current feedback signal at conductor 43 is of zero magnitude while the voltage feedback signal at conductor 44 is at a maximum value. Accordingly, the output of amplifier 42 provides a voltage signal proportional to the setting of reference 40 which establishes the desired set point of voltage.

For intermediate settings of gang 47, output 50 produces modified proportional set point signals related to the slope characteristic established by the current and voltage feedback signals.

Amplifier 42 also provides low pass filtering for smoothing the otherwise high ripple content of the current feedback applied to input 42c and the voltage feedback applied to input 42b.

The output of amplifier 42 is applied to amplifier 52 which provides both integral plus proportional control of the feedback for system 10. The output of amplifier 52 is applied by way of an overcurrent unit 200 which controls the firing networks of a firing unit 55. Firing unit 55 provides properly timed and spaced firing pulses to a bank of triggered silicon controlled rectifiers in rectifier 14. Overcurrent unit 200 protects the silicon controlled rectifiers from excessive short term surge or output currents. Specifically, the silicon controlled devices are turned off after a safe delay whenever a long term moderate output current is produced. Unit 200 also is effective to turn off the silicon controlled devices in a very short period of time if the output current rate of increase becomes excessive.

Accordingly, by the use of unit 200, system 10 is able to perform its normal function, especially in the GMAW mode, of melting the weld metal without having to use excessively large circuit components or having a large number of protective circuit operations Unit 200 is effective to protect the rectifiers not only for a long time overcurrent but also for a short time excessive current surge. This is achieved in unit 200 since it can be set to match the characteristics of the particular rectifiers 14 that are used. Accordingly, unit 200 provides more protection than fuses or circuit breakers while providing immediate reset capabilities without expensive down time or component replacement.

Firing unit 55 is adapted to provide properly timed and spaced firing pulses to a bank of triggered silicon controlled rectifiers in rectifier 14. With this proper phasing of rectifier 14, there is established and maintained a desired voltage and current characteristics at output lead 15 and 16 and therefore to arc 26.

In order to assist in the start of supply system 10, a start circuit 53 is effective to provide controlled arc energy at the start of operation to more easily establish arc 26. This starting condition is adjustable to provide enough time to allow the arc to become established with a predetermined amount of control response compatible with the type of welding process being performed. It will be understood that the arc itself can generate a substantial effect upon the reliable operation especially at the start of operation. The type of shielding gas used, the welding process used and the condition or existence of a molten weld puddle all cause a variable and fast changing set of controlled conditions. Thus the adjustability of the starting condition is especially important when switching from GMAW (MIG) process using argon for arc shielding to the GTAW (TIG) process using helium gas for shielding.

System 10 is "hardened" and protected from much of the adverse effects of interference from switching surges, lightning and load surges, arc starting equipment and other interference generating equipment. As will later be described in detail, reverse parallel connected, also called back to back diode rectifiers are used at the inputs of operational amplifiers to prevent input signals from exceeding the forward voltage drop of the rectifier. In addition, capacitors are used where practical to shunt out radiated high or moderately high frequency interference energy. In addition, input filtering capacitors are effective to shunt and block out such high frequency energy which may be conducted into system 10 on lines coming into or going out of the equipment.

Detailed Description — FIGS. 2–2a

Referring now to FIGS. 2–2a, there is shown a detailed drawing of supply system 10 in which transformer 12 comprises, for example, a three phase delta primary 60 and secondary 62 are suitably coupled on a common core (not shown) to provide a constant potential transformer. Power source 11 is coupled to primary 60. The common 64 or start point of secondary 62 is connected by way of lead or load line 15 through current sensing shunt 22 to work member 23. The outer end of each phase winding of secondary 62 is connected through respective silicon controlled rectifiers (SCR) 70a–b, 71a–b, 72a–b and then through a smoothing and stabilizing inductor 67 and lead or load line 16 to electrode 20. Inductor 67 has a value of inductance and a value of resistance selected for optimum welding performance in each of the modes of welding. These values of inductance and resistance are effectively modified by the characteristics of the total system. Inductor 67 has taps as shown or may have a second control winding so that different values of inductance may be selected for such different modes of welding. To suit certain applications, additional resistance may be inserted between inductor 67 and line 16 which provides for optimization in a selected mode.

It will be understood that each of the six phase windings of the star connected secondary 62 are connected to separately conducting SCRs. Thus phase 62a is connected to SCR 70a–b and then through reactor 67 to line 16. The adjacent phase 62b is connected to similar pair of SCRs 72a–b. Each of the SCRs 70a–b, 71a–b and 72a–b is connected to a firing unit 55 for proper pulsing with the six SCRs being pulsed in proper sequence. In this manner, the portion of the halfwave of each winding applied across leads 15–16 is controlled by the phased firing of the respective SCRs whenever the polarity of that winding is proper for conduction.

In the GTAW process, it is desirable to utilize a background supply comprising auxiliary secondary windings 66a–c in the main power transformer 60. Windings 66a–c are connected in three phase delta with the output thereof coupled to a background rectifier 69. Rectifier 69 may be connected as a three phase bridge rectifier. The output of the rectifier 69 is coupled through a switch 69a to leads 15 and 16. This circuit operates to help establish a more stable arc by smoothing the ripple produced by the arc and by providing an extremely fast acting output limited primarily by resistance.

Firing unit 55 may be any one of the firing units well known in the art to provide the required phase control and firing of SCRs. For example, unit 55 may be a firing unit known as Part No. R613F372 manufactured by Firing Circuit, Inc., Norwalk, Connecticut.

Firing unit 55 is actuated by an input conductor 74 which is coupled by way of a gain control potentiometer 75 to output 77 of amplifier 52. The signal at conductor 74 determines the particular time in each half cycle at which a firing pulse is applied to a particular SCR and thereby determine the particular time in the phase that SCR conducts the output applied to it from secondary 62. Since power source 11 is also applied to firing unit 55, this power input is synchronized with the control voltage applied to an SCR. The firing of the SCR is modified by the input signal at conductor 74 which reflects the current feedback produced by unit 45 and the voltage feedback produced by unit 47 through summation amplifier 42 thereby to establish a desired voltage and current slope characteristic.

It will be understood that transformer 12 may comprise other transformer arrangements such as Delta-Detla, WYE-Delta, etc. As known by those skilled in the art with these other transformers, the SCRs, firing unit and transformer winding sequence and polarity are suitably arranged and connected.

Shunt 22 normally comprises a millivolt shunt connected in series with lead 15 although other means of obtaining a current related signal are just as applicable. The upper end 22b of shunt 22 is coupled by way of common lead 80 to the junction of fixed contacts of current and voltage feedback potentiometers 82, 83 respectively. Common 80 is the common for the entire electronic feedback circuit. The lower end 22a of shunt 22 is coupled by way of conductor 84 to the other fixed contact of current potentiometer 82. In this manner, potentiometer 82 is coupled across shunt 22 and the current feedback signal is taken from movable arm 82a of potentiometer 82 with respect to common 80. That current feedback signal is applied to input 42c of summing filter amplifier 42.

Summing Filter Amplifier 42

Within amplifier 42, input 42c is coupled to an input circuit 85 comprising resistors 90a–c in series and capacitors 97a–b. One end of the series resistance circuit is connected to input 42c and the other end is connected to a summing junction 92 of an operational amplifier 100 which comprises the amplifying device of summing filter amplifier 42. The feedback network 102 of operational amplifier 100 comprises resistors 103–106 and capacitors 108–11. The values of these resistance and capacitance feedback components are selected in conjunction with the values of resistors 90a–c and capacitors 97a–b to provide adequate filtering of the desired current feedback signal. These components are further selected to provide proper voltage gain to make the current feedback signal compatible with the voltage levels applied to inputs 42a, 42b and 42d. The voltage levels applied to inputs 42a–b and d may for example each be adjusted to approximately a 10 volt maximum level.

For sensing voltage feedback, a series circuit of a potentiometer 17b and a suitable resistor 17a (load resistors 17) is connected between the other fixed contact of potentiometer 83 and load line 16. In this manner, the potential between load lines 15 and 16 is developed across the series circuit combination of resistors 17a–b and 83 with the voltage feedback signal taken from arm 83a of potentiometer 83 with respect to common. By suitably moving arm 83a, the voltage feedback signal is adjusted to a level compatible with the set point reference voltage 40. The voltage feedback signal is applied by way of conductor 44 to input 42b. Within amplifier 42, input 42b is connected to input circuit 86 comprising resistors 93a–c in series circuit coupled to junction 92 and capacitors 98a–b. The values of the components of this resistance-capacitance network are selected in conjunction with the feedback resistance-capacitance network 102 to provide adequate, unity gain filtering of the voltage feedback signal.

For the reference set point voltage, reference circuit 40 comprises a potentiometer 91 having its arm connected to input 42a. One fixed contact of the potentiometer is connected to common while the other fixed contact is connected through a potentiometer 96 to a positive supply. Input 42a is coupled within amplifier 42 to an input circuit 87 comprising resistors 94a–c in series circuit and capacitors 99a–b. The values of these components are selected in conjunction with the values of the components of the resistance-capacitance feedback network 102 to provide a transfer function for the reference input which is compatible with the current feedback to input 42a and the voltage feedback to input 42b.

When pulses from generator 250 are desired to be applied to amplifier 42, switch 252 is closed. Accordingly such pulses are applied by way of input 42d and then through an input circuit 95 comprising resistors 254a–c in series circuit and capacitors 253a–b. The operation of generator 250 will later be described in detail.

The ends of input circuits 95 and 85-87 remote from inputs 42d, 42c, 42b and 42a, respectively are summed at junction 92 which is coupled to the negative input of operational amplifier 100. Input circuits 95 and 85–87 and feedback network 102 effectively define a Butterworth filter network.

Interference Protection — Amplifier 42

Identical diodes 160 and 161 are connected between junction 92 (the inverting or negative input) of amplifier 100 and common with the diodes being connected back to back (inverse parallel). These diodes are used to prevent the applied input signal to amplifier 100 from exceeding in value the forward voltage drop of the diodes. In addition, a capacitor 162 is also connected between junction 92 and common to effectively shunt out high or moderately high frequency interference energy which may be present at the input of the amplifier. Capacitor 165 may also be connected between the output of amplifier 100 and common to shunt high frequency signals to common.

An additional input to junction 92 may be traced by way of a resistor 116 and then to an arm of a potentiometer 115. One fixed contact of potentiometer 115 is connected by way of a resistor 114 to a positive supply and the other fixed contact is connected to common. Potentiometer 115 and resistor 114 form an adjustable voltage divider network used to calibrate the low end of the reference potentiometer readout when the slope is adjusted to the constant current mode. Potentiometer 96, previously described, is used to calibrate the high end of reference potentiometer 91 readout in amperes when the slope is adjusted to the constant current mode.

With gang 47 at its extreme right position (corresponding to the extreme clockwise position) it will be seen that arm 82a is at its furthest position from common while arm 83a is at its closest position. Accordingly, the current feedback is at a maximum and the voltage feedback is at a minimum. On the other hand, with gang 47 in its extreme left hand position (corresponding to the extreme counterclockwise position) arm 82a is at its closest postion to common while arm 83a is at its furthest position. Accordingly, the current feedback is zero and the voltage feedback is maximum.

Amplifier 52

The output of operational amplifier 100 is applied by way of a potentiometer 120 and a resistor 121 to the negative input of an operational amplifier 125; the positive input of which is connected by way of a resistor 123 to common. Diodes 166 and 167 similar to diodes 160, 161 are connected back to back between the negative input of amplifier 125 and common to prevent the input signals to that amplifier from exceeding the forward voltage drop of the diodes. Capacitor 170 is connected between the output of amplifier 124 and common for shunting of high frequency components to ground in addition to that provided by capacitors 162 and 165.

The output of amplifier 125 is also connected by way of selectable integrator capacitors 130, 130a and a resistor 131 to the negative input. In this manner, operational amplifier 125 operates as an augmented integrator, or integral plus proportional amplifier. In the steady state if a perturbation occurs in the error signal at the output of operational amplifier 100, then capacitor 130 charges in such a direction as to drive the output of amplifier 125 and hence the firing circuit 55 to that level necessary to reduce the error signal to zero. Potentiometer 120 may be adjusted to set the closed loop gain of the feedback circuit.

When it is desired to switch from GMAW (MIG) using argon for arc shielding to GTAW (TIG) using helium gas for shielding, it is sometimes necessary to change the intergration time of operational amplifier 125. The reason for this is that helium is more unstable than argon and it is normally required to slow down the response time of the intergration. In this way, the feedback response is slowed down so that the feedback does not itself overcorrect for the instabilities in the arc itself. Accordingly, integration capacitor 130a is selected to be of capacitance value greater than that of intergration capacitor 130 and selector switch 133 is moved to engage capacitor 130a. In this manner, there is provided a predetermined control response compatible with the type of welding process being performed.

Start Circuit 53 with Start Weld Level Control

Start circuit 53 is provided to assist in the start of supply system 10. It will be understood that in both manual and automatic welding that it is often desired to have different weld currents at the start of operation in order to more easily establish arc 26. However, once the arc has been established, it is necessary that the weld current be changed to its normal desired value as established by reference 40.

In order to provide this start level, current feedback by way of the conductors 84 and 130 is applied through a resistor 132 to a negative input 135a of an operational amplifier 135. The current feedback produces an effective negative potential at input 135a. Input 135a is also connected by way of a voltage divider network 136 to a positive supply. The positive input of amplifier 135 is connected by way of a resistor 138 to common. When the value of the negative potential produced by the current feedback reaches a level greater than the positive potential developed by network 136 (start reference signal), then the output of amplifier 135 changes polarity thereby to turn on a switching transistor 140 as shown. The collector of transistor 140 is coupled to a relay 142, the normally closed contacts 142a of which are coupled between an arm of a potentiometer 144 and a diode 145. As shown, this circuit is connected between the input and output of amplifier 125, thereby providing an output clamp on this amplifier.

Accordingly, at start up, relay 142 is deenergized and the normally closed contact 142a is effective to apply the start weld level setting of potentiometer 144 to the input of amplifier 125. This level setting is applied to firing unit 55 for the selected value of start up voltage. This selected value may be greater than that of normal operation. When the weld current I increases sufficiently to produce a potential at input 135a of amplifier 135 greater than the setting of voltage divider 136 then transistor 140 switches thereby energizing relay 142 and opening the contact 142a. With contact 142a open, the start weld setting is removed and amplifier 52 operates normally.

In the manner previously described, arc 26 may generate adverse effects and particularly upon the reliable operation of the feedback circuit. For example, the type of shielding gas used in the arc, the particular welding process used and the condition or existence of a molten weld puddle all cause control conditions to vary. Thus, when the feedback exceeds the positive start reference potential developed by network 136, the arc may not be fully established and it may be too early to begin normal welding. Accordingly, to avoid a decrease in the feedback with a resultant establishment of a start level (oscillatory state) a capacitance circuit is provided between the output of amplifier 135 and common. The capacitance circuit may comprise a multipositioned switch 179 which is effective to select one of the timing capacitors 180–182. The values of these timing capacitors are selected to provide a desired time delay. Specifically, the selected capacitor 180–182 does not permit transistor 140 to switch (thereby actuating relay 142) until the selected capacitor has become fully charged. This charging time is a function of the value of a capacitor.

An additional time delay is provided by capacitor 185 which is coupled across relay 142. This capacitor is effective to prevent relay 142 from becoming deenergized if there occurs a short time duration outage of the arc. Specifically, if there is an erratic or short time outage of the arc, it would have the effect of switching off transistor 140 which would tend to deenergize relay 142. However, capacitor 185 is effective to maintain the relay energized for that short period of time even though transistor 140 is turned off.

It is in this manner there is provided an adjustable starting condition by means of selecting a timing capacitor 180–182 to provide the sufficient time to allow the welding arc 26 to become established.

For further interference protection, identical diodes 172 and 173 are often connected between negative input 135a and common with the diodes being connected back to back. These diodes are used in the same manner as diodes 160, 161, to prevent the applied signal to amplifier 135 from exceeding in value the forward drop of the diodes.

Overcurrent Protection Unit 200

As shown in FIG. 2a, overcurrent protection unit 200 is effective to protect rectifiers 14 not only for a long time overcurrent but also for an excessive short time current surge.

Specifically, current feedback is taken from conductor 84 by way of conductor 84a and input resistors 202 and 203 to the negative input 205a of an operational amplifier 205. Input 205a is also connected to a voltage divider network by way of a resistor 207 to an arm 209a of a potentiometer 209. To complete the voltage divider network, potentiometer 209 is connected, as shown, in series with a resistor 211 with the series circuit being connected between a positive supply and common. The current feedback provides a negative potential at input 205a while the voltage divider provides a positive potential. Arm 209a is set to provide at input 205a a positive potential approximately 25 per cent greater than the negative feedback potential corresponding to the maximum rated output of system 10.

Accordingly, in normal operation of system 10, a positive potential is applied to input 205a which produces a negative going potential at output 214 which is fed back through the cathode and anode of a diode 215 to input 205a thereby driving output 214 back to zero. Output 214 is connected by way of a resistor 217 to the negative input 220b of an operational amplifier 220 which operates as a comparator. The positive input 220a thereof is connected by way of resistor 222 to a positive supply and a resistor 224 to common. With a zero valued potential at 214, the output of amplifier 220 is negative going which is blocked by diode 225. Diode 225 is connected by way of a resistor 230 to the gate of an SCR 232, the anode of which is connected by way of a relay 240, and LED signal indicator 240a and a normally open contact 243a to a positive supply. As shown, switch 241 is normally closed thereby energizing relay 243 and closing its contact 243a. The cathode of SCR 232 is connected to common by way of an optional reset normally closed switch 241a. In normal operation SCR 232 is off and thus relay 240 is deenergized and its normally closed contact 240b is effective to normally connect the output of amplifier 52 to firing circuit 55. The normally open contact 240a is effective when closed, to ground or connect to common the firing circuit and thereby deactivate it.

When the current feedback produces a negative potential at input 205a greater in value than the positive potential of the voltage divider, then output 214 begins to go positive. Accordingly, diode 215 is turned off and integrating capacitor 212, connected between terminals 205a and 214, begins charging. It will be understood that capacitor 212 integrates the potential at output 214 and therefore for a fast rising surge, the integration (the charging of the capacitor) is at a fast rate and the potential at terminal 214 rapidly increases. Capacitor 212 is selected to have a charging time similar to the time current characteristics of the SCRs of rectifier 14.

As capacitor 212 charges, the potential at output 214 and input 220b increase in positive potential until that positive potential is greater than the reference potential at input 220a. At that time, SCR 232 turns on thereby operating relay 240 to deactivate firing circuit 55. However, if the surge decreases sufficiently before the capacitor has charged sufficiently so that the potential at input 220b is greater than the reference then the relay is not actuated. In other words, if the surge current feedback is not sustained long enough to have capacitor 212 charged to a magnitude greater than the reference then relay 240 is not actuated. In this manner, a high surge but a relatively short duration of overcurrent is allowed to pass through the system and not actuate the overcurrent protection. On the other hand, if the surge is excessive and is of sufficient duration, and capacitor 212 charges beyond the reference, then the protection comes into effect.

The foregoing examines the critical short term excessive surge protection. With regard to long term overcurrent protection, it will be understood that the potential at output 214 effectively follows the potential at input 205a. Accordingly, the overcurrent protection value is effectively set by potentiometer 209. When the current feedback produces a potential at input 205a which exceeds the setting then relay 240 is actuated.

In order to choose the proper capacitance value of capacitor 212, a typical curve of SCR 70a-72b is taken and the critical points of the time-current characteristics of the SCRs are examined. For example, it may be known that the zero to 100 millisecond curve is most critical and therefore protection along this curve would be given most consideration.

An alarm system is normally provided to indicate overcurrent tripping. As for example, LED 240a lights when relay 240 is energized indicating tripping of the unit.

It will be understood that the overcurrent protection unit 200 can be reset quickly and remotely after firing unit 55 has been deactivated. Specifically, with the firing unit deactivated, the current feedback decreases to zero. With switch 241 located in a desired remote position, the switch may be momentarily opened so that contact 243a opens thereby turning off SCR 232. With SCR 232 turned off, relay 240 is deenergized thereby opening contact 240a and closing contact 240b. With switch 241 again closed, contact 243a is also closed and unit 200 and system 10 have been reset to the operating state. A further manual reset switch 241a may be provided to alternately turn off SCR 232 instead of switch 241 and relay 243.

Pulse Generator 250

In FIG. 2, there is shown a pulse generator 250 which applies a series of pulses to section 95 of the Butterworth filter and then to summing junction 92 if switch 252 is closed. In this manner, amplifier 42 mixes the pulses with the other input signals which is effective to control the firing of the SCRs in rectifier 14 thereby to vary their ON time and OFF time and thus the magnitude of current.

The purpose of the pulsing is to benefit the stirring or wetting action between the puddle and the base metal 20 (the solid portion of the workpiece). Thus there is an improvement in welding quality, welding ease and welding consistency thereby to increase the performance capability of the welding machine. In a specific example, if there is a 1 percent background current (the normal current that system 10 is set for) then the pulses may be set for a maximum of 100 percent of machine output rating over that background current. The frequency of pulses may be, for example, at 10 pulses per second.

More particularly as shown, the series of pulses are summed along with the reference potential and the current and voltage feedback by the amplifier 100. Generator 250 comprises an operational amplifier 255 which is connected as an astable multivibrator. Specifically, the output of amplifier 255 is connected by way of cross connected diodes 260 and 261 and potentiometers 262 and 263 respectively to negative input 255a. In addition, input 255A is connected as shown (1) by way of diodes 265a-b to common and (2) by way of capacitors 266a-b to common. The positive input of amplifier 255 is coupled by way of selector switch 275 to an arm of a potentiometer 270 one side of which is connected to the output of the amplifier. Thus, the frequency of oscillation may be selected by potentiometers 262-3 while the pulse amplitude may be selected by means of selector switch 275 connected as illustrated or moved to be connected to the arm of potentiometer 276. Thus, with switch 252 in its closed position, a selected pulse frequency and amplitude is applied from junction 268 by way of a potentiometer 280 to switch 252.

It will be understood that the pulsed output may be "tapered" by an external circuit, not shown, in which the magnitude of the pulse may be varied to conform with a welding program rather than remain at a fixed magnitude.

What is claimed is:

1. A direct current arc power supply for maintaining an arc between a pair of electrodes in which upon start of operation a startup direct current is applied to said electrodes for a sufficient time to allow said arc to become established, comprising power means operable for providing direct current to said electrodes, reference setpoint means to produce a set reference signal related to a desired value of said direct current, means for sensing said arc current and providing a current feedback signal, means for sensing the voltage across said electrodes and providing a voltage feedback signal, feedback control means coupled to said power means for summing said set reference signal, said current feedback signal and said voltage feedback signal for applying a control signal to said power means to control the volt-ampere charateristic of said direct current, start reference means for producing a start reference signal, and start means for comparing said current feedback signal with said start reference signal, said start means including switch means for varying said control signal upon start up to produce a value of said direct current different from said desired value, said start means including time delay means for switching said direct current to said desired value upon a determined time delay interval after said current feedback signal increases to a predetermined value with respect to said start reference signal.

2. The arc power supply of claim 1 in which said start means includes a first amplifier having one input coupled to said arc current sensing means, said switch means including relay means connected to an output of said first amplifier and having at least one relay contact, means producing a start level setting connected to said relay contact and to said feedback control means for said varying of said control signal.

3. The arc power supply of claim 2 in which said time delay means comprising a plurality of capacitors of differing capacitive values and switching means for connecting selected ones of said capacitors to said relay means for providing said desired value of time delay interval.

4. The arc power supply of claim 3 in which said relay means include a relay coil and in which there is further provided an additional capacitor connected across said relay coil to prevent said relay means from actuating upon occurrence of a short time duration outage of said arc which would decrease the current feedback signal below said predetermined value.

5. The arc power supply of claim 2 in which said feedback control means includes a second amplifier having integrator capacitor means connected in a first feedback loop therewith and providing at an output said control signal, said start level setting means coupled in a second feedback loop whereby upon startup said start level setting is applied to the input of said second amplifier.

6. The arc power supply of claim 5 in which said integrator capacitor means comprises a plurality of integration capacitors selectively connected in said first feedback loop whereby a capacitance value is selected to provide a predetermined control response compatible with the type of welding process being performed.

7. An arc power supply for applying direct current to a pair of electrodes for establishing and maintaining an arc between said electrodes, comprising power means having controlled rectifiers operable for providing direct current to said electrodes, reference setpoint means to produce a set reference signal related to a desired value of said direct current, adjustable means for sensing said arc current and providing an adjustable current feedback signal, adjustable means for sensing the voltage across said electrodes and providing an adjustable voltage feedback signal, feedback control means coupled to said power means for summing said set reference signal, said adjustable current feedback signal and said adjustable voltage feedback signal for applying a control signal to said power means to control the volt-ampere characteristic of said direct current, first and second protection reference means for producing first and second protection reference signals, and overcurrent protection means comprising means for first comparing said adjustable current feedback signal with said first protection reference signal said first comparing means including integrating means having a time constant similar to the time current characteristics of said power means for integrating a surge of said adjustable current feedback signal, second means for comparing an output signal of said first comparing means for deactivating said power means when said output signal is of value greater than said second protection reference signal thereby to protect said arc power supply from current surges of excessive duration.

8. The arc power supply of claim 7 in which there is provided switching control means connected to an output of said integration means, said switching control means being maintained normally turned off upon application of a high surge current of a shorter duration than said predetermined time interval and being turned on when said surge current is of at least said predetermined time duration.

9. The arc power supply of claim 8 in which there is provided relay means coupled to said switching control means for deactivating said power means when said switching control means is turned on.

10. The arc power supply of claim 9 in which there is provided means for resetting said overcurrent protection means after said power means is deactivated comprising means for turning off said switching control means.

11. The arc power supply of claim 7 in which there is provided start means for comparing said adjustable current feedback signal with a start reference signal for varying said control signal upon start up to produce a value of said direct current different from said desired value, said start means including time delay means for switching said direct current to said desired value upon a predetermined time delay interval after said adjustable current feedback signal increases to a predetermined value with respect to said start reference signal.

12. An arc power supply for controlling the direct current applied by way of lead means to a pair of electrodes which establishes and maintains an arc between said electrodes. comprising power means having controlled rectifiers and operable for providing through said lead means direct current to said electrodes, reference setpoint means to produce a set reference signal related to a desired value of said direct current, first adjustable means connected to said lead means for sensing said arc current and providing an adjustable current feedback signal, second adjustable means connected to said lead means for sensing the voltage across said electrodes and providing an adjustable voltage feedback signal, pulse generator means for producing a series of pulses of predetermined pulse repetition frequency and amplitude, and feedback control means coupled to said power means for summing said set reference signal, said adjustable current feedback signal, said adjustable voltage feedback signal and said series of pulses for applying a control signal to said power means to control the firing of the controlled rectifiers thereby to vary their ON time and OFF time and thus the magnitude of said direct current.

13. The arc power supply of claim 12 in which there is provided means for simultaneously adjusting both said first and second adjustable means to provide infinite and continuous control of a volt-ampere characteristic of said direct current between a constant current characteristic and a constant potential characteristic.

14. The arc power supply of claim 13 in which said pulse generator means includes an astable multivibrator and in which there is provided means for varying the frequency of oscillation and the pulse amplitude.

15. The arc power supply of claim 14 in which said power means comprises silicon controlled rectifiers for rectifying a source of alternating current for providing said direct current and firing means adapted to provide properly timed and spaced firing pulses to rectifiers of said recitifier means under the control of said control signal.

* * * * *

UNITED STATES PATENT AND TRADEMARK OFFICE
CERTIFICATE OF CORRECTION

PATENT NO. : 3,912,980
DATED : October 14, 1975
INVENTOR(S) : Gwyn N. Crump et al It is certified that error appears in the above—identified patent and that said Letters Patent are hereby corrected as shown below:

Column 3, Line 17
 Delete "of system 10 is preset normally to either" and substitute therefor -- is generally desired. In the automatic --

Column 3, Line 30
 After "system", insert -- 10 --

Column 3, Line 64
 Delete "to" and substitute therefor -- of --

Column 7, Line 25
 Delete "42a" and substitute therefor -- 42c --

Column 8, Line 23
 Delete "124" and substitute therefor -- 125 --

Column 12, Line 60
 Delete "determined" and substitute therefor -- predetermined --

Signed and Sealed this

Thirty-first Day of August 1976

[SEAL]

Attest:

RUTH C. MASON
*Attesting Officer*

C. MARSHALL DANN
*Commissioner of Patents and Trademarks*